United States Patent
Hantschel et al.

(10) Patent No.: US 6,756,584 B2
(45) Date of Patent: Jun. 29, 2004

(54) PROBE TIP AND METHOD OF MANUFACTURING PROBE TIPS BY PEEL-OFF

(75) Inventors: Thomas Hantschel, Amesdorf (DE); Wilfried Vandervorst, Mechelen (BE)

(73) Assignee: Interuniversitair Microelektronica Centrum (IMEC), Leuven (BE)

( * ) Notice: Subject to any disclaimer, the term of this patent is extended or adjusted under 35 U.S.C. 154(b) by 83 days.

(21) Appl. No.: 09/955,565

(22) Filed: Sep. 12, 2001

(65) Prior Publication Data

US 2002/0047091 A1 Apr. 25, 2002

Related U.S. Application Data

(60) Provisional application No. 60/233,276, filed on Sep. 18, 2000.

(30) Foreign Application Priority Data

Oct. 27, 2000 (EP) .............................................. 00870246

(51) Int. Cl.[7] .................................................. H01J 5/16
(52) U.S. Cl. ........................... 250/234; 250/311; 216/11
(58) Field of Search .................... 250/234, 306–311, 250/216; 73/105; 216/2, 11

(56) References Cited

U.S. PATENT DOCUMENTS 5,923,033 A * 7/1999 Takayama et al. .......... 250/234

FOREIGN PATENT DOCUMENTS

EP 0 763 844 B1 6/2000

OTHER PUBLICATIONS

Hantschel, T., "The fabrication of a full metal AFM probe and its applications for Si and InP device analysis", Proc. Micromachining and Microfabrication Conference, (1999).

Hantschel, T., et al., "Fabrication and use of metal tip and tip–on–tip probes for AFM–based device analysis", Proc. of SPIE, 3512, pp. 92–103, (1998).

Hantschel, T., et al., "The peel–off probe: a cost–effective probe for electrical atomic force microscopy", Proc. SPIE, vol. 4175. pp. 50–59, (Sep. 18–19, 2000).

* cited by examiner

Primary Examiner—Thanh X. Luu
(74) Attorney, Agent, or Firm—Knobbe, Martens, Olson & Bear LLP

(57) ABSTRACT

A full metal probe and a method of making the metal probe for electrical atomic force microscopy. In one embodiment, the method comprises manufacturing the full metal probe using two lithography steps. The step of etching thin membranes is dropped or eliminated to substantially reduce the processing time. Thus, topside processing is sufficient. The probe and tip can be peeled off from the wafer using a metallization procedure.

18 Claims, 13 Drawing Sheets

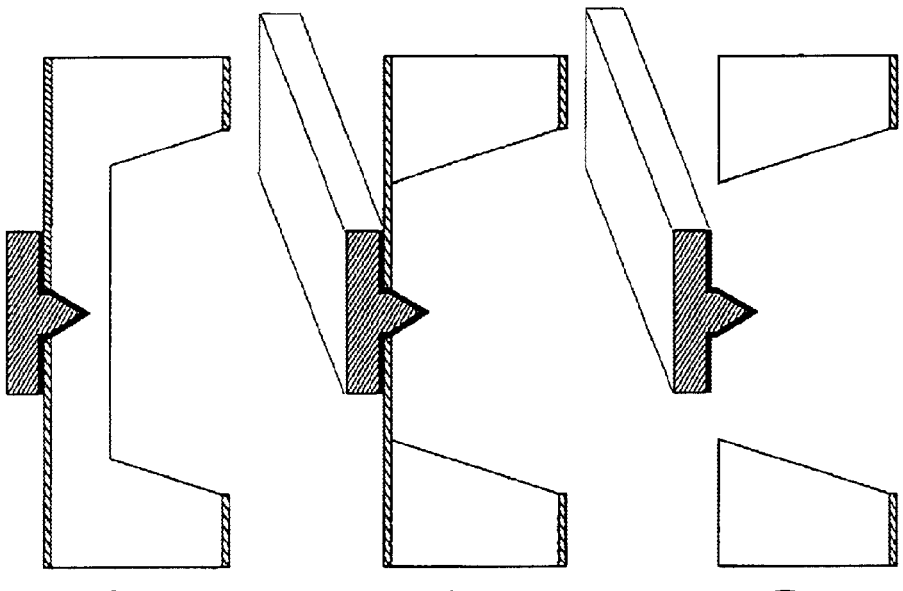
FIG. 1D (PRIOR ART)
FIG. 1E (PRIOR ART)
FIG. 1F (PRIOR ART)
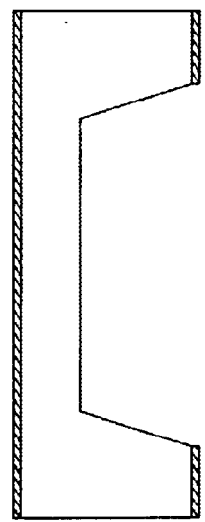
FIG. 1A (PRIOR ART)
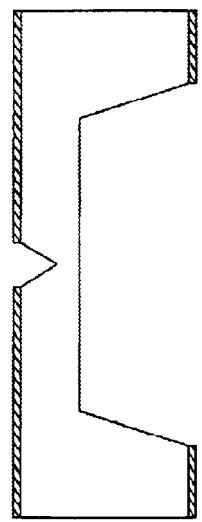
FIG. 1B (PRIOR ART)
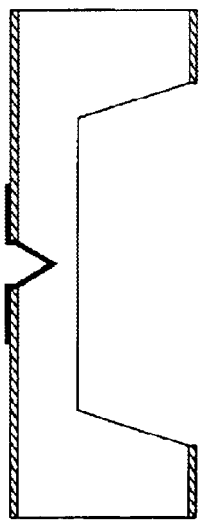
FIG. 1C (PRIOR ART)

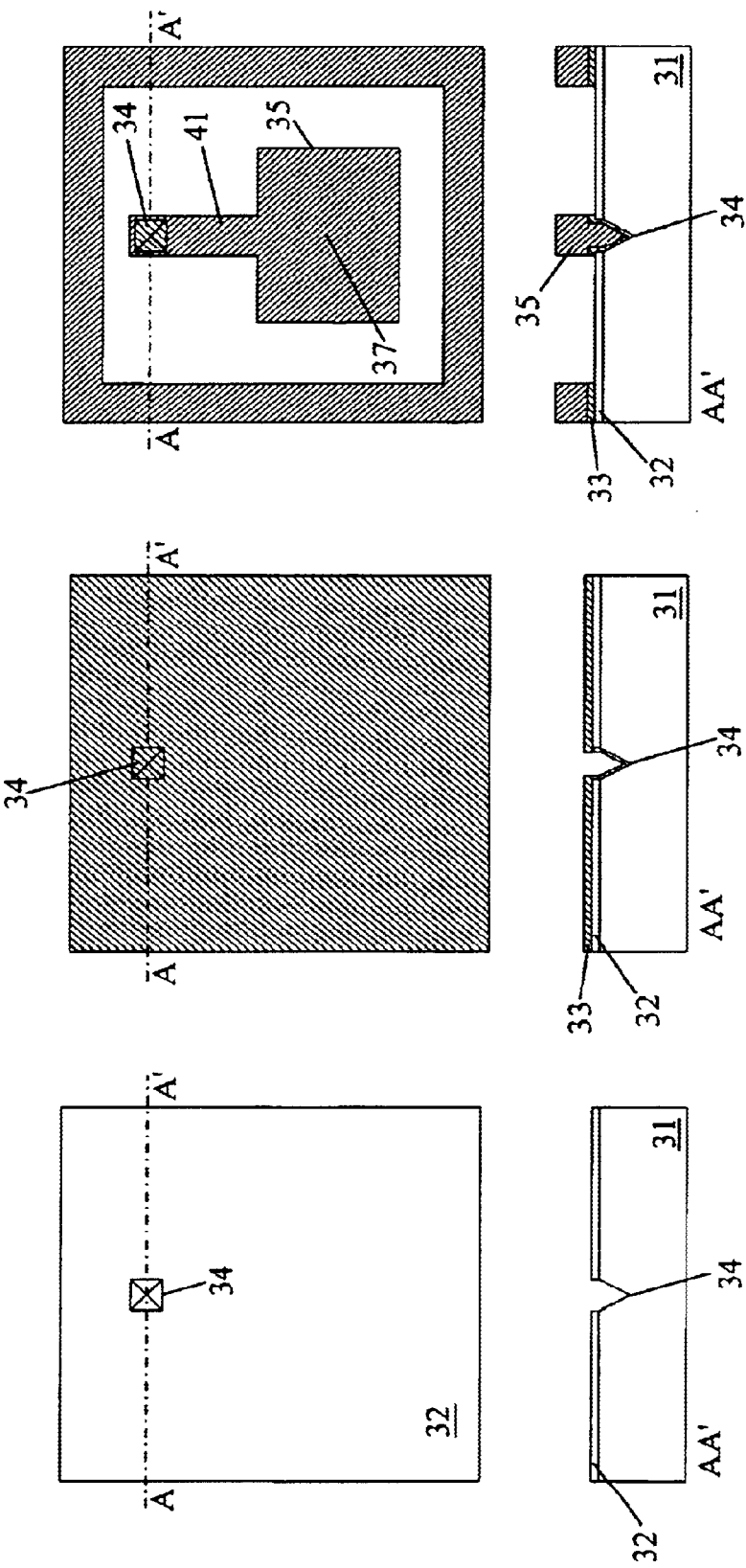

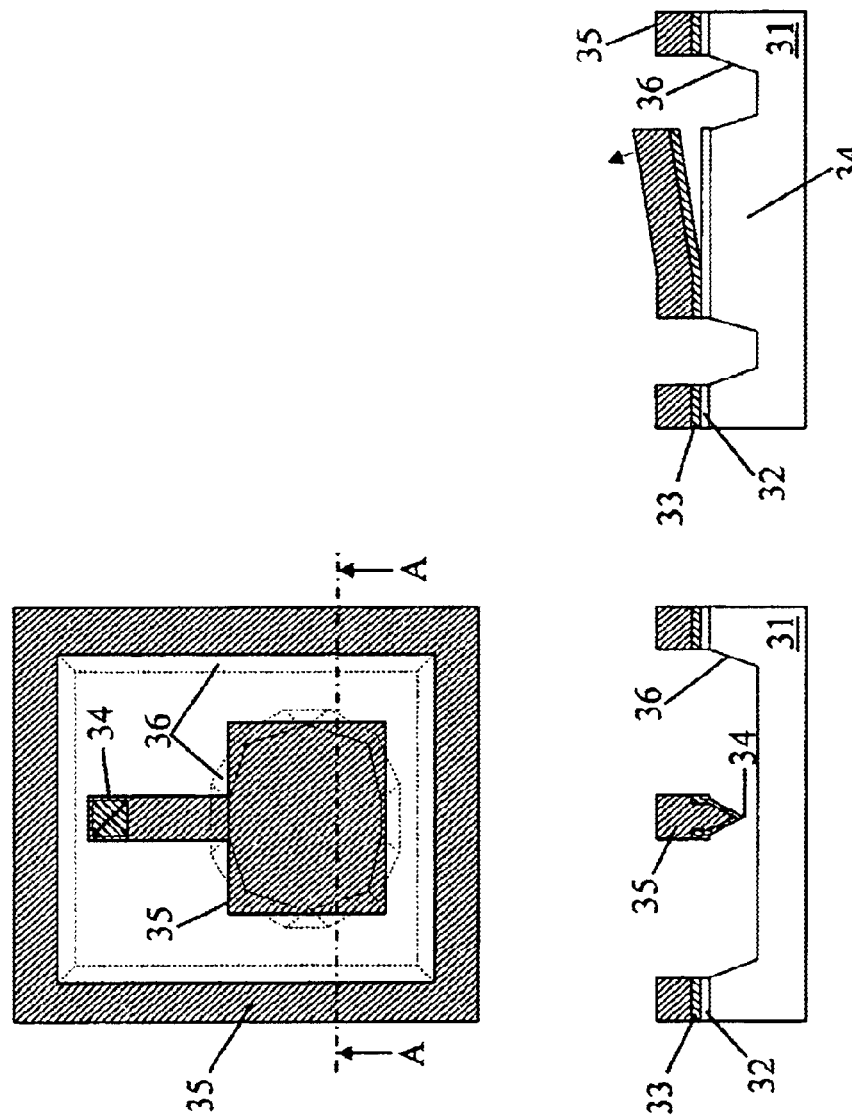

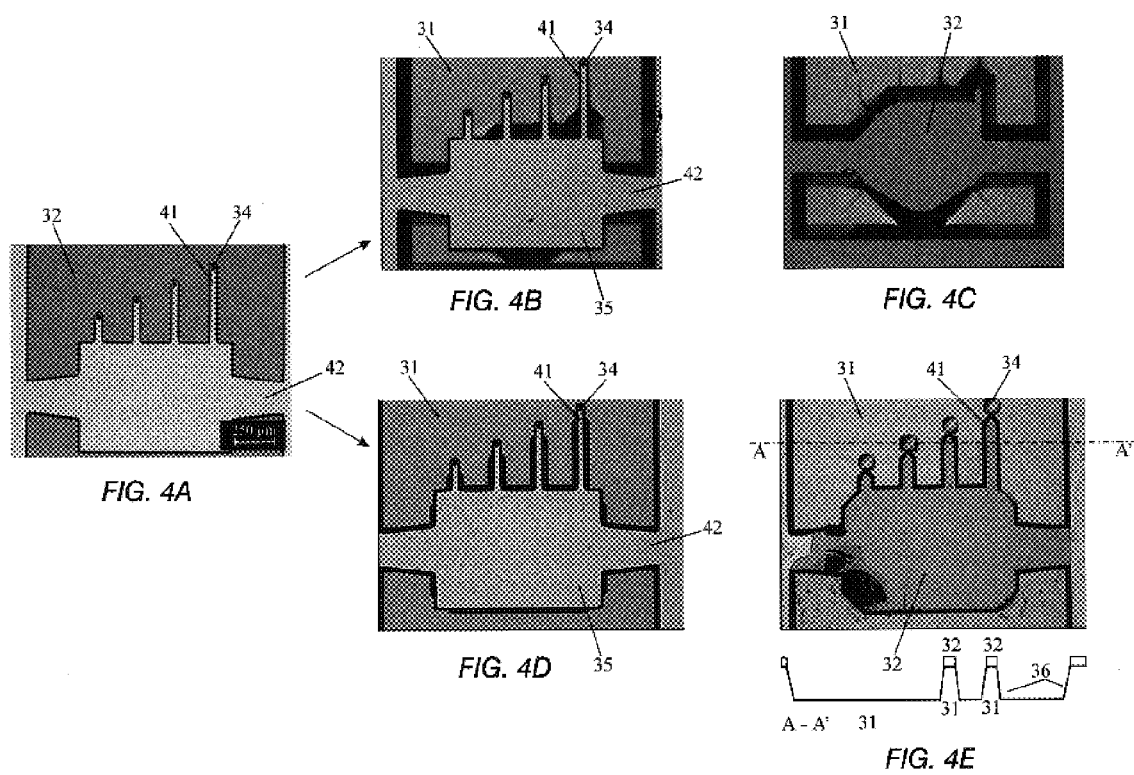

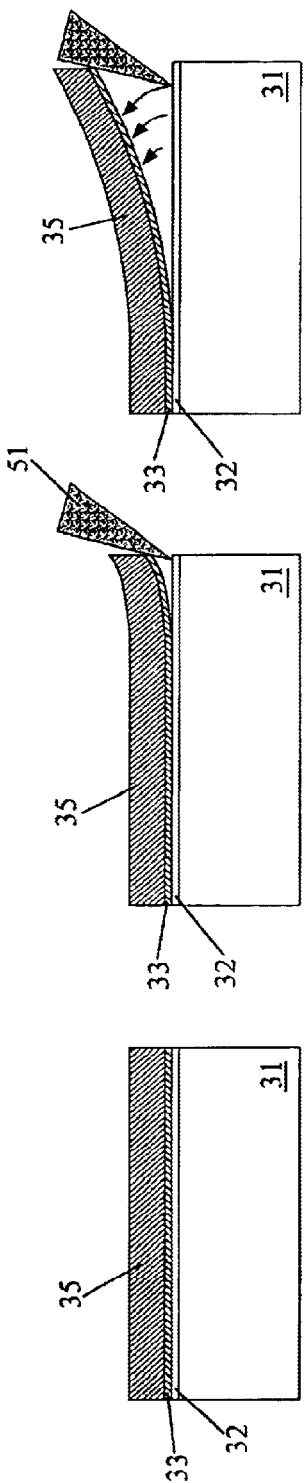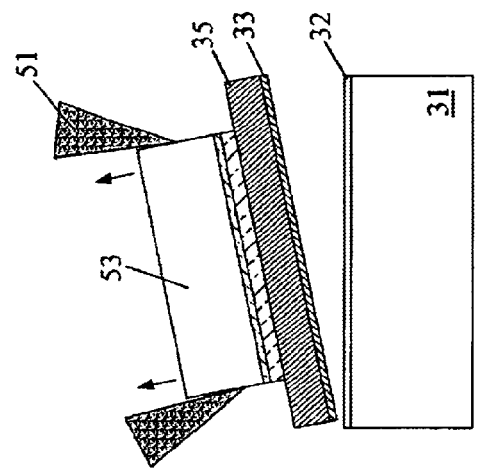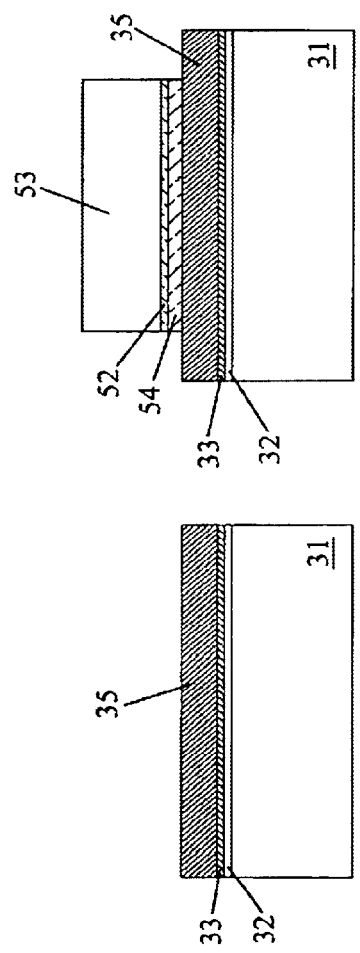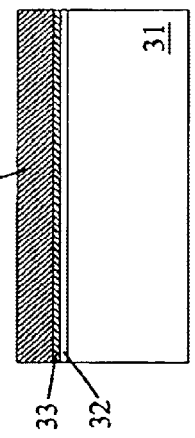
FIG. 5A  FIG. 5B  FIG. 5C  FIG. 5D  FIG. 5E  FIG. 5F

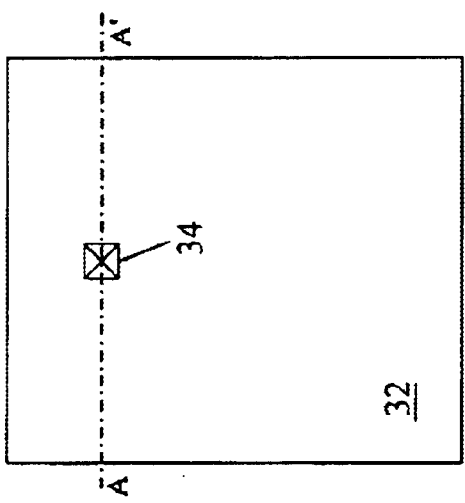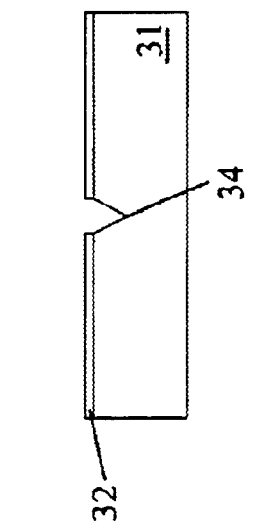
FIG. 8A
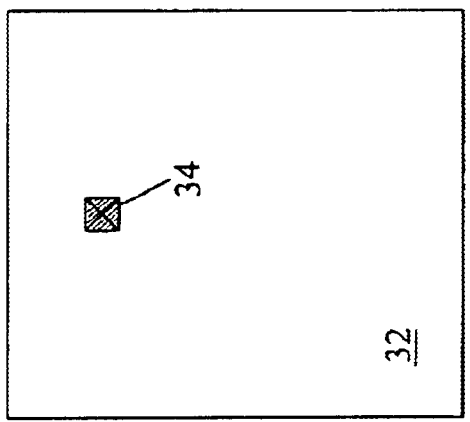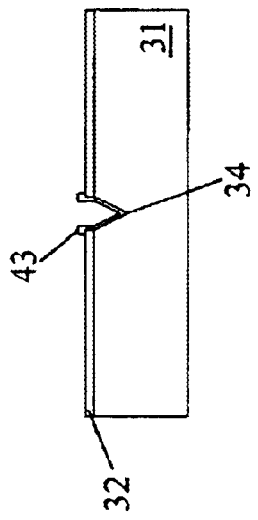
FIG. 8B
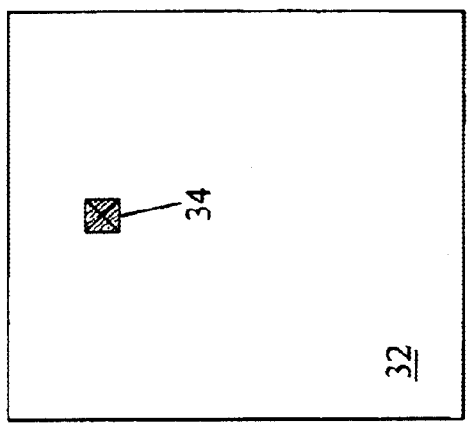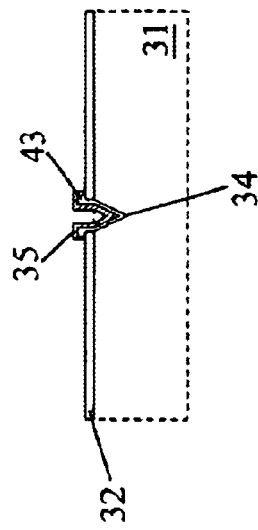
FIG. 8C

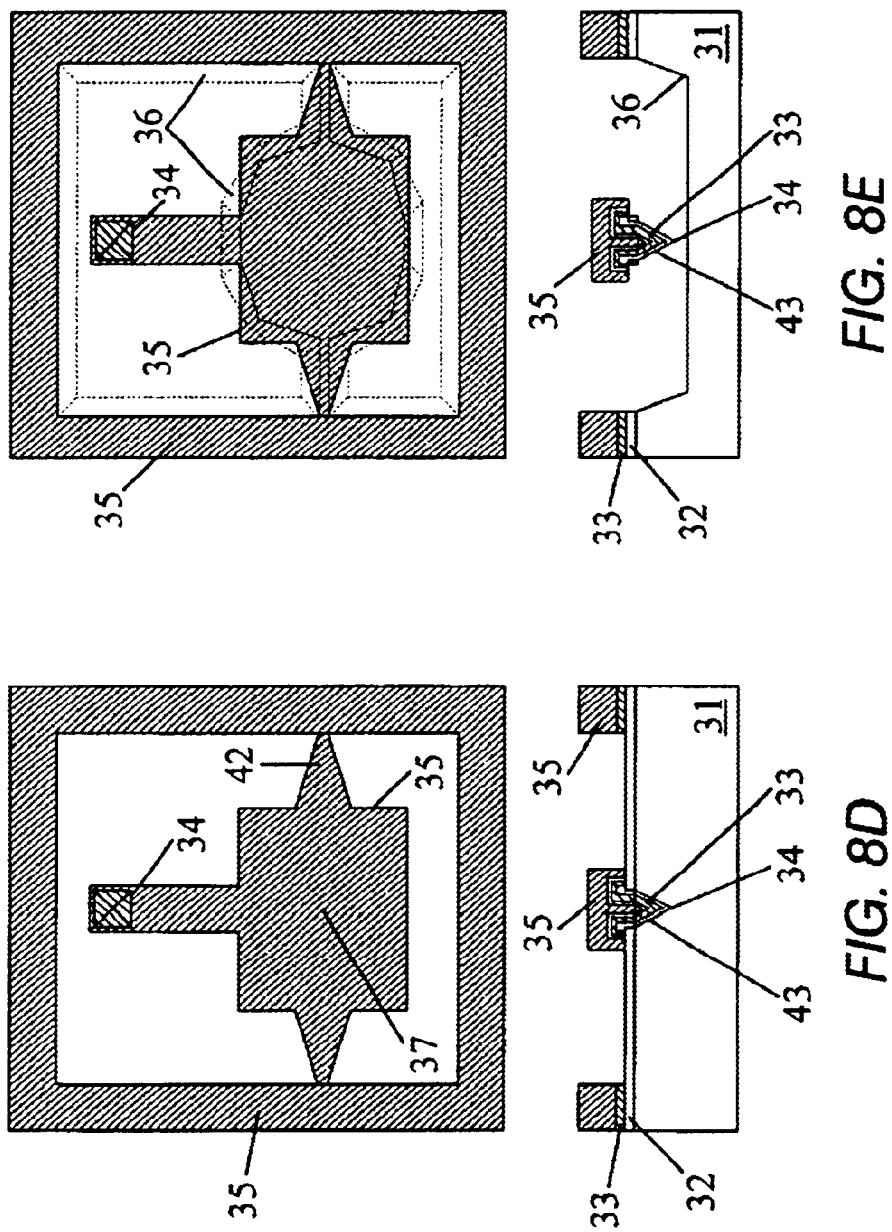

PROBE TIP AND METHOD OF MANUFACTURING PROBE TIPS BY PEEL-OFF

RELATED APPLICATIONS

This application claims priority under 35 U.S.C. § 119 to U.S. provisional application entitled "METHOD FOR MANUFACTURING TIPS AND PROBES FOR DETECTING MICROCURRENT OR MICROFORCE AND DEVICES OBTAINED THEREOF", having application Ser. No. 60/233,276, and filed on Sep. 18, 2000. This application also claims priority under 35 U.S.C. § 119 to European patent application number EP 00870246.6, filed on Oct. 27, 2000.

BACKGROUND OF THE INVENTION

1. Field of the invention

The invention is generally related to a scanning tunnelling or atomic force microscope and more particularly to the manufacturing of tip and probe used in said scanning tunnelling or atomic force microscope.

2. Description of the Related Art

Scanning tunnelling microscopy (STM) and electrical atomic force microscopy (AFM) enables us today to carry out electrical and/or topographical measurements on modern semiconductor devices with nanometer (nm) spatial resolution. These measurements are done by scanning at least one small conductive tip over the device surface and recording at the same time topographical information and/or electrical signals.

Metal is preferably used as tip material due to its excellent electrical conductivity. Silicon (Si) tips with a thin metal coating, typically 10–25 nm thick, are commercially available since the early 1990's but the metal coatings rapidly wear off. Therefore solid metal pyramids made by the so-called molding technique have been developed which are integrated into Si cantilevers or metal cantilevers. The metal cantilever probes, also called full metal probes, are preferred because they are highly conductive and require fewer process steps. In European Patent No 0899538"A probe tip configuration, a method of fabricating probe tips and use thereof", (which is hereby incorporated by reference in its entirety) the inventors discloses a method of fabricating probe tips applying said so-called molding technique. The fabrication and use of a metal tip is disclosed in "Fabrication and use of metal tip and tip-on-tip probes for AFM-based device analyses", by T. Hantschel et al. Proc. of SPIE, 3512, pp. 92–103, 1998 (which is hereby incorporated by reference in its entirety). A method of manufacturing full metal probes is disclosed in "Fabrication of an all-metal atomic force microscope probe", J.P. Rasmussen, Proc. Of Transducers '97, p 463–466, 1997 or in "The fabrication of a full metal AFM probe and its applications for Si and InP device analysis", T. Hantschel et Al., Proc. Micromachining and Microfabrication conference, 1999 (both hereby Incorporated by reference in their entirety). This manufacturing method is schematically illustrated in FIG. 1e–1f. In FIGS. 1e and 1f the cantilever is drawn in side view for the purpose of teaching.

1. The wafer needs to be processed from both sides whereby precautions have to be taken to protect the non-processed side.
2. A lithographic tool, e.g. a mask aligner, is required to align patterns defined on the backside of the substrate to the front or topside of the wafer.
3. The backside of the silicon substrate will be etched to release at the front-side the cantilever with metal tip (see FIGS. 1a,e) and hence the substrate cannot be re-used.
4. This backside etching requires wafer scale uniformity of e.g. wafer thickness, etch speed, etch selectivity to avoid local over-etching of the tip and/or probe and it is a time consuming step.
5. During this etch step the tip, e.g. its radius or sidewalls, can be modified by the etch chemicals.

In European Patent No. 0763844 entitled "method of manufacturing micro-tip and female mold substrate therefor, and method of manufacturing probe with micro-tip" (which is hereby incorporated by reference in its entirety) some of these disadvantages are indicated. The inventor T. Yagi proposes a method to overcome some of the above-mentioned disadvantages, as illustrated in FIG. 2. According to European Patent No. 0763844 the first substrate is used to define the probe tip (23) while the second substrate is used to define the cantilever. Depending on the choice of the second substrate or its stack composition several types of cantilevers can be obtained. The first substrate could be re-used.

The above mentioned process method still suffers from the following disadvantages:

1. Two substrates are required to manufacture a probe tip with cantilever.
2. The metal, peeling layer and substrate have to be chosen such to obtain the correct relative strength of the different layers to allow tearing off the first second substrate from the probe tip.
3. The second substrate still requires an etching of the rear surface to define a cantilever and to release the probe tip. All problems related to such rear side etching remains.

Therefore, there is a need in the industry for a cost effective method of manufacturing tips and probes for use in scanning tunnelling or atomic force microscopes.

SUMMARY OF THE INVENTION

It is an aim of the invention to achieve a cost and time efficient method to manufacture probes used in scanning microscopy, e.g. AFM, STM, SSRM or likewise. This method comprises front side processing steps and avoids the backside lithography and time consuming etching steps required to create a probe membrane or to release the probe membrane. This method requires one substrate to form a full probe consisting of a probe tip, cantilever and probe membrane. This method allows easy removal of the probe prior to mounting the probe into a scanning microscope.

Another aim of the invention is to achieve a method of manufacturing a full metal probe comprising front side lithography steps, thereby allowing the probe tip and the cantilever to be separately processed. Hence the probe tip can be made from a material or metallisation scheme different from that of the cantilever. The characteristics of the probe tip can optimised independently from the cantilever.

It is one object of the invention to disclose a cost and time efficient method to manufacture probes used in scanning microscopy, e.g. AFM, STM, SSRM or likewise. This method comprises front side processing steps and avoids the backside lithography and time consuming etching steps required to create a probe membrane or to release the probe membrane.

One object of the invention is to a method comprising the steps of providing a substrate, depositing on said substrate a hard mask. During a first patterning step a mold is created in said hard mask and said substrate. A first layer is deposited on said patterned hard mask. This first layer has a sufficiently high enough adhesion to said hard mask to allow further processing, but this adhesion force is weak enough to be overcome when peeling the probe gradually from said underlying hard mask. During a second patterning step said first layer is patterned to form a probe tip configuration comprising at least a probe tip. By partially or fully under-etching said probe tip configuration from the front side of the substrate, the probe tip configuration can be removed from said substrate by lifting the probe.

Said method can further comprise the step of forming selective to said patterned first layer at least one additional layer before under-etching said patterned stack.

Said method can further comprise the step of mounting a holder chip to said probe tip configuration before peeling of the probe.

Said hard mask can be nitride, oxide, oxynitride or a combination of layers. Said first layer can be a metal, preferably a stack of Ti:W and Au.

Another object of the invention is to a method of manufacturing a full metal probe comprising front side lithography and processing steps, thereby allowing the probe tip and the cantilever to be separately processed. Hence the probe tip can be made from a material or metallisation scheme different from the cantilever. After depositing the first layer or a stack of layers the area of the probe tip is defined in an intermediate, third, patterning step. Hereafter a second layer can be deposited on said hard mask and said patterned first layer. This second layer will be patterned in the last patterning step to define the probe tip configuration consisting of probe membrane or contact area, cantilever and overlapping the probe tip area. Said second layer can be a metal, preferably a stack of Ti:W and Au.

Said method can further comprise the step of forming selective to said patterned second layer at least one additional layer before under-etching said patterned stack.

BRIEF DESCRIPTION OF THE DRAWINGS

All drawings are intended to illustrate some aspects and embodiments of the invention. Devices and fabrication steps are depicted in a simplified way for reason of clarity. Not all alternatives and options are shown and therefore the invention is not limited to the content of the given drawings. Like numerals are employed to reference like parts in the different figures.

FIGS. 1a–f represent a prior art method of manufacturing a full metal probe comprising a tip, cantilever and membrane applying the molding technique, illustrated by cross sectional views.

FIGS. 3a–e represent a process scheme for peel-off probes made by two lithography steps, upper part is top view, and bottom part is a cross sectional view along section AA.

FIGS. 4a–e represent a probe with 4 cantilevers illustrating the peel-off process illustrating the options of fully or partially under-etching the probe FIGS. 5a–f represent a probe removal by peel-off according to an embodiment of the invention.

FIGS. 8a–e represent a process scheme for peel-off probes with different metallisation scheme for probe tip and cantilever, upper part is top view, and bottom part is a cross sectional view along section AA.

DETAILED DESCRIPTION OF THE INVENTION

Figure 2A:
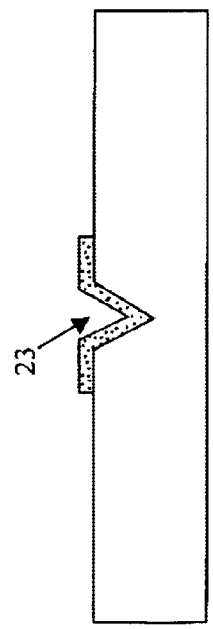
FIGS. 2a–e represent a prior art method of manufacturing a tip to avoid backside etching of the molding substrate illustrated by cross sectional views.
Figure 2B:
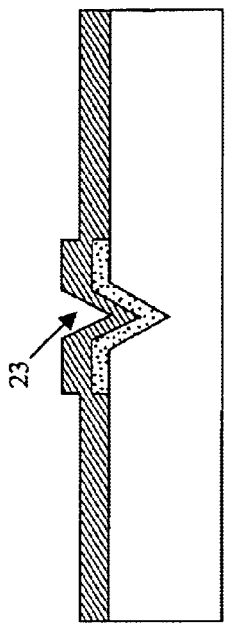
Figure 2C:
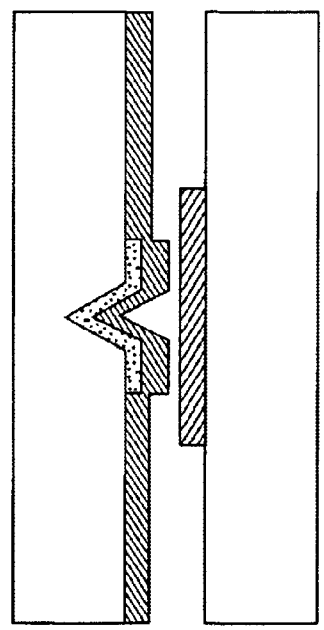
Figure 2D:
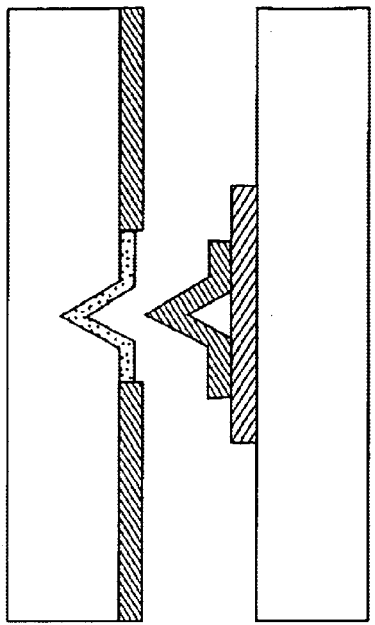
Figure 2E:
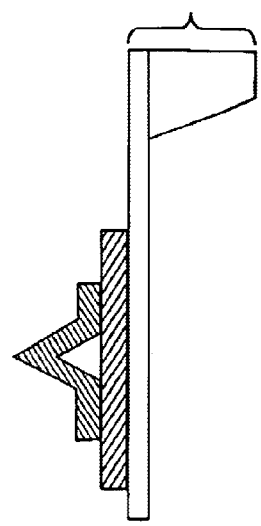

The following describes the invention in detail in relation to the appended drawings. It is apparent however that a person skilled in the art can imagine several other equivalent embodiments or other ways of executing the invention, the spirit and scope of the invention being limited only by the terms of the appended claims.

In one embodiment of the invention, it is desirable to apply the method of the invention only to front side processing steps and, more particularly, to lithographic steps. The method allows an easy removal of the probe tip by peeling off the manufactured probe from the underlying substrate.

In a first embodiment, a method of manufacturing a scanning probe requiring only front side processing steps is disclosed. This method comprises two front side lithographic steps. The peel-off effect is achieved by selectively metallising the area of the probe tip configuration. This metal layer has a sufficiently high enough adhesion to the substrate to allow further processing, but this adhesion force is weak enough to be overcome when peeling the probe gradually from the wafer.

This method comprises the following steps. During the first patterning step a mold (34a) is formed in the starting substrate (31), preferably a silicon wafer. (FIG. 3a) This mold may have one of various shapes, e.g., pyramidal, a truncated cone, a cylinder. In case a silicon wafer is used a truncated pyramidal etch pit is formed by anisotropically etching the substrate trough an opening defined in a masking layer formed on top of the substrate. Such a masking layer can be a photo resist or a hard mask (32), e.g. nitride, oxide, oxynitride or a combination of layers. This step of defining the probe tip configuration comprises the first front side lithographic step.

On top of the first surface, i.e. the top surface of the substrate, or the hard mask if used, in which the mold is defined, a first layer (33), preferably metal, is deposited. (FIG. 3b)

During the second patterning step the probe tip configuration is defined (FIG. 3c). The probe tip configuration consists at least of the probe tip (34), but can also comprise the cantilever (41) and/or the contact area (37) in case a complete probe has to be manufactured. Selective to this first layer additional layers (35) can be deposited using techniques known to a person skilled in the art. If the first layer is a metal additional layers can be plated onto this first layer to create a stack having the desired properties. Such properties are e.g. the mechanical strength of the cantilever that may require a certain thickness, wear-out properties of the probe tip that may require a certain stack composition and hence puts also requirements on the first layer. Between the first layer and the first surface a high contact force exists to allow further processing, but this contact force must be low enough to allow gradually peeling off the probe. Further processing can comprise wet processing steps such as plating, wet etching, cleaning or temperature processing steps such as annealing steps.

After the desired stack is formed the probe tip configuration is fully or partially under-etched (36) (FIG. 3d) from the front side of the substrate. If a hard mask is used, first the hard mask is removed using the probe tip configuration as a masking layer. Underneath the area of the probe tip configuration the hard mask remains. Then the substrate is etched from the front side selective to the probe tip configuration. Partially under-etching will release only the probe tip from the substrate. Fully under-etching will also release the cantilever. Preferably this under-etching is done using an isotropic etch chemistry, e.g. a wet etch such as a KOH-mixture in case of silicon substrates. The probe can now be peeled off from the substrate (FIG. 3e).

A holder chip (53) can be attached to the probe, e.g. to the contact area if formed, to ease further handling or mounting of the probe. If so, a substantial part of the probe tip configuration, comprising the first layer and additional layers formed upon, is temporarily spaced apart from the underlying substrate or hard mask. (FIG. 5c) The holder chip is attached to the probe (FIG. 5e) and holder chip with the probe is then fully removed from the first surface (FIG. 5f).

In a second embodiment, the method of manufacturing a full metal probe with two front side lithographic steps is disclosed.

The starting substrates (31) were (100)-Si wafers having a diameter of 150 mm. These wafers were covered with 470 nanometer (nm) thermally grown oxide (32), $SiO_2$, and 150 nm low-pressure chemical vapour deposited (LPCVD) nitride, $Si_3N_4$. (see FIG. 3a) Photoresist was spun onto the wafers and squares (34) of 40×40 square micrometer ($\mu m^2$) were opened in the photoresist during the first lithography step. These squares define the tip area (34). This resist pattern was then transferred to the $Si_3N_4$ layer by reactive ion etching (RIE) using a $SF_6:O_2$ etching mixture. Next, the resist was removed and the nitride pattern was transferred to the $SiO_2$ layer by etching the oxide layer with buffered HF (BHF). Inverted pyramids were then etched in 30% KOH at 70° C. for 55 minutes. The wafer surface was covered with a 10 nm thick layer of sputtered Ti:W followed by a 30 nm thick layer of evaporated Au (33). (see FIG. 3b)

Photoresist was again spun onto the wafer. The resist outside the area of the probe tip configuration was removed by the second lithography step, thereby leaving the area of the probe tip configuration covered with resist. The Au layer was etched in a solution of $KI:I_2:H_2O$. Then the Ti:W layer was removed by RIE in a $SF_6$ atmosphere. Next, the photoresist was stripped.

A 12 $\mu$m thick Ni layer (35) was deposited on the area of the probe tip configuration by electroless Nickel (Ni) plating. Prior to this plating the wafer was pre-treated in a $PdCl_2$ solution which helps to initiate the autocatalytic Ni deposition. The plating was done in two steps. First, 1 $\mu$m of Ni was deposited using the MeTeC-NiP-LT bath from OTB Berlin (Berlin, Germany). The bath temperature was 70° C. and the deposition time was 10 minutes. This solution showed in all experiments an excellent starting behaviour but the plated Ni films had a rough surface that would prevent the laser light from being reflected to the detector in the AFM. This first layer is therefore used as a starting layer for the next plating step. The second plating step was done using the ENPLATE Ni 434 E bath from Enthone-OMI ('s-Hertogenbosch, Netherlands) at 85° C. for 1 hour until its final value of 12 $\mu$m. Rough Ni surfaces were smoothed after being plated for some time in the Enthone-OMI solution. After plating the wafer was rinsed in a water bath which had the same temperature as the plating bath in order to prevent the formation of mechanical stress in the plated Ni film. Rinsing the wafer in cold water immediately after plating resulted in cracks in the Ni cantilevers and the lift-off of plated structures. It should be mentioned that a fresh Enthone-OMI solution had to be used for each plating run. The structures were partially plated if the same bath was used twice. The OTB-Berlin bath showed a good long-term stability and could be used for many runs. (see FIG. 3c) The selective deposition of the thick Ni films was improved by applying this two-step plating process.

The $Si_3N_4$ layer, outside the area of the probe tip configuration, was etched away by RIE in an $SF_6:O_2$ atmosphere using the plated Ni film as an etching mask. The $SiO_2$ layer underneath the nitride layer was opened in BHF. The tip and the cantilever were finally under-etched along the crystal planes (36) in 30% KOH at 70° C. for about 5 hours. After a final rinse in hot water at 70° C. and careful $N_2$ drying the probes were ready to be peeled off from the wafer. (see FIG. 3d)

FIG. 4 illustrates the under-etching of the cantilevers during the anistropic KOH etching. As can be seen, in this particular design one probe has four cantilevers (41), respectively 200, 400, 600 and 800 $\mu$m long. The cantilevers are 65 $\mu$m wide and 12 $\mu$m thick. The pictures were taken under an optical microscope. FIG. 4a shows the probe before etching with the $Si_3N_4$ layer (32) still in place (FIG. 4a). FIG. 4b illustrates the case of under-etching the cantilevers (41), the tips (34) and the bridges (42) (FIG. 4b). FIG. 4c shows the probe after the probe membrane was peeled off (FIG. 4c). The yield after under-etching was nearly 100%, which was also confirmed by several process runs. An advantage of the developed procedure is that the probe membranes are not free standing as the full wafer, contrary to conventional probe molding, supports them. Therefore the probes survive mechanical shocks during and after processing without any problem. The total under-etching time depends on the longest or largest cantilever.

Although the probe membranes can be peeled off directly from the substrate, it is more convenient to mount small holder chips to the contact area (37) prior to peeling. The holder chips easy probe handling and mounting in the AFM. FIG. 5 shows the peeling procedure schematically. A cross section of the probe tip configuration before peeling can be seen in FIG. 5a. First, one of the two bridges (42, FIG. 4b) was lifted up with a sharp needle (51) under a microscope (FIG. 5b). After the bridge was broken, the probe membrane (35,33) was gradually peeled off (FIG. 5c). After removing the needle, the membrane fell back into its initial position (FIG. 5d). The connection between the membrane (35,33) and the nitride (32) is no longer present. In one embodiment, the probe remains attached to the substrate via only the unbroken bridge. Silicon chips (53) (3.0 mm long, 1.2 mm wide, 0.6 mm thick) metallised with 20 nm Ti:W+45 nm Ni+100 nm Au (52) were then soldered (54) to the probe membranes (35) by a procedure which is described in detail in "Mounting of moulded AFM probes by soldering", Proc of SPIE 4175, 2000. After soldering, the probe was peeled off completely using a pair of tweezers (51) (FIG. 5f). The whole wafer containing about 600 probes was mounted in this way. By partially peeling off the probe membranes before the soldering step the removal of the probe with holder chip turned out to be very easy and didn't require additional handling.

Figure 6A:
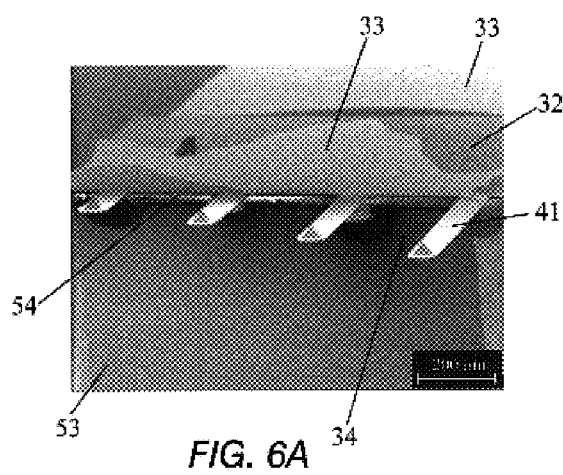
FIGS. 6a–c represent a SEM picture of full metal peel off probe according to the preferred embodiment.
Figure 6B:
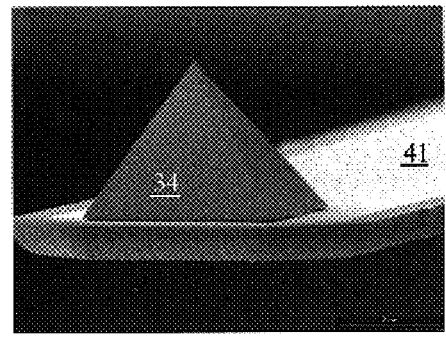
Figure 6C:
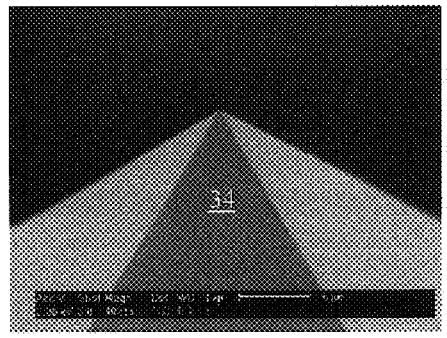
Figure 7A:
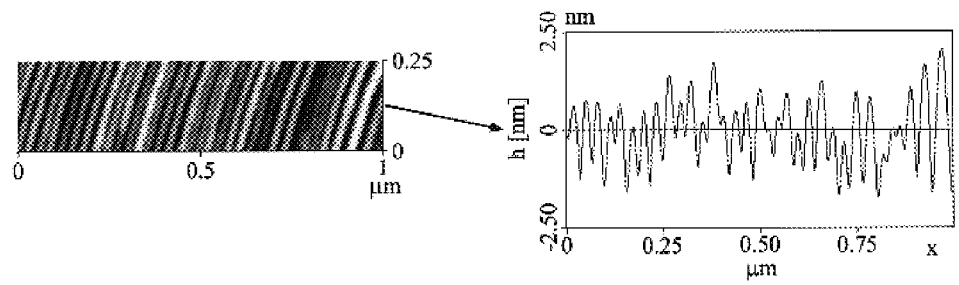
FIGS. 7a–b represent a topography measurements done on a SrTiO3 calibration sample in tapping mode. Left side shows the AFM picture. Right side shows the measured height h measured along the cross section x.
Figure 7B:
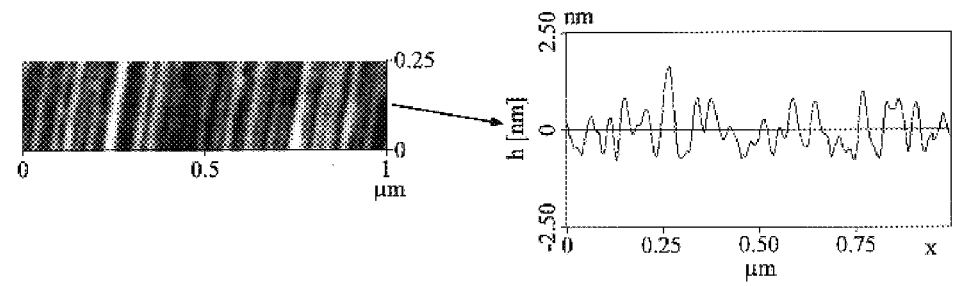

FIG. 6a shows a peel-off probe after it was removed from the wafer. It can be seen that the metal membrane (33) is fixed to the Si chip (53) by the solder connection (54). The bright area on the probe membrane is metal which indicates the peel-off area. The dark area is $Si_3N_4$ from the under-etched area. FIG. 6b shows the end of a full metal cantilever beam. It can be seen that cantilever (41) and metal pyramid (34) are well defined. A close-up of the tip is shown in FIG. 6c. The tips had a radius of typically 50 to 100 nm which is slightly higher compared to previous fabricated probes, typically 20 to 50 nm. This was due to the long under-etching time of 5 hours where the tip was attacked by the KOH. FIG. 7 compares topography measurements on a calibration surface, such as $SrTiO_3$, with a Si cantilever with integrated metal pyramid and a peel off probe according to the invention. The metal pyramid on the Si cantilever is clearly sharper than the one on the peel off probe.

Before peeling off the probe the metal cantilevers are fully under-etched leading to the problems mentioned above. Therefore, the under-etching time in KOH was reduced in the next runs. This was achieved by using shorter cantilevers or peeling off the contact area and the cantilevers instead of under-etching them. The etching time was reduced from 5 hours to 1 hour which corresponds with an etch depth of 40 $\mu$m for the given etch solution. The reduced etch time resulted in a substantially reduction of the process time but also in smaller tip radii. AFM or STM microscope with small probe tip radii can measure samples with a higher resolution. This partial under-etching is also shown in FIG. 4. FIG. 4d shows the probe having the probe tip (34) etched free. A schematic cross-section of FIG. 4d is drawn underneath the picture. During the last minutes of the etching, the tip is exposed to the etching solution. After cutting one bridge (42), the probe was gradually peeled off as described above. FIG. 4e shows the wafer surface after removal of the probe. So if the pyramidal tip (34) is under-etched, the probe with hardened probe tip (34), cantilever (41) and contact (37) area can still be peeled off.

In a second aspect a method of manufacturing a full metal probe is disclosed comprising front side lithography steps, allowing the probe tip and the cantilever to be separately processed. Hence the probe tip can be made from a material or metallisation scheme different from the cantilever.

In a first embodiment of this aspect the probe tip and cantilever are made of the same material but in a separate and different metallisation scheme.

It is known in the state of the art that the hardness of as-deposited Ni films made by electroless plating can be increased from about 500 HV (HV: Hardness Vickers) up to 1000 HV by an annealing the Ni-plated probe tip at 300 to 400° C. Such methods are for example disclosed in "Nickel and chromium plating", $2^{nd}$ edition, J. K. Denis et al., Butterworths ltd, p. 269–277, 1986, which is hereby incorporated by reference. The plating step and the subsequent annealing step are to be executed after the processing of the probe tip. After applying this procedure on full metal probes a strong bending of the cantilever was however observed, probably due the thermomechanical stress in the cantilever. Therefore the step of annealing the Ni probe tips has to be executed before manufacturing the Ni cantilevers. This separate processing of probe tips and cantilever was achieved by carrying out two metallisation steps. The overall fabrication process is similar to that described in another embodiment of this invention and therefore only the main steps are discussed.

After etching the inverted pyramid (see FIG. 8a) the probe tip area (34) was metallised by a lift-off procedure. Photoresist was again spun onto the wafer. Applying an additional lithography step will remove the resist substantially above the inverted pyramids. During this additional lithography step the probe tip mask of the first lithography step, used to define the probe tip area (34), is used again. The wafer was then covered with 10 nm Ti:W+30 nm Au (43). In one embodiment, the metal film is structured by lift-off leaving only the probe tip area covered with metal, applying techniques known to a person skilled in the art (see FIG. 8b). The thickness of the metal stack within the area of the probe tip configuration was then increased up to 4 $\mu$m by exposing the wafer to the Ni plating solution from OTB-Berlin at 70° C. for 30 minutes as disclosed in another embodiment of the invention (see FIG. 8c). The pyramidal tip is thus at least partially filled. Afterwards, some tips were hardened by rapid thermal annealing (RTA) for 10 minutes at 300° C. Other tips were annealed at 400° C. Longer anneal times, e.g. 1 hour, can improve the hardness of the probe tip. The full wafer surface was then again coated with 10 nm Ti:W+30 nm Au (33). In the last lithography step the area of the probe tip configuration (35) was covered with resist and the stack of Au and Ti:W is etched away outside this area (see FIG. 8d). The two-step Ni plating sequence was again applied to metallize the area of the probe tip configuration, as disclosed in another embodiment. The cantilevers (41) were under-etched (see FIG. 8e) and the probes were peeled off from the wafer.

Figure 9A:
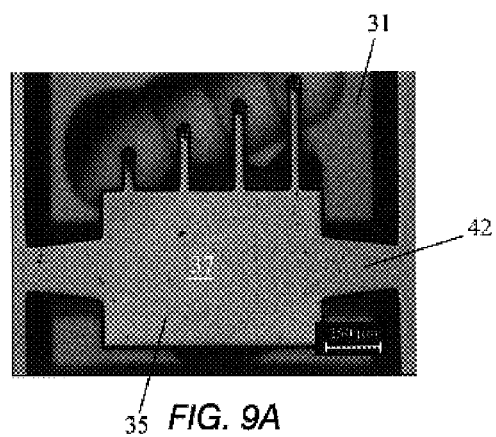
FIGS. 9a–d represent a metal cantilever with hardened tip made by peel off according to one embodiment of the invention.
Figure 9B:
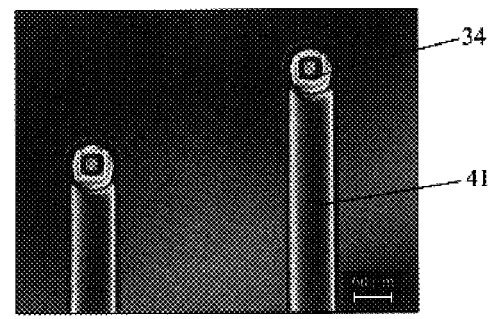
Figure 9C:
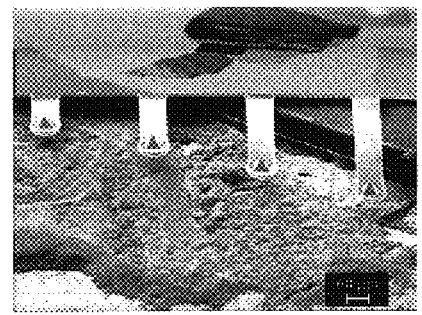
Figure 9D:
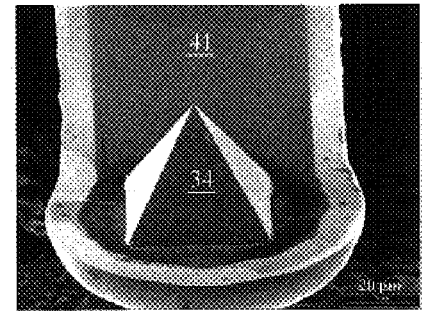

FIG. 9a shows the probe topside imaged by an optical microscope after the under-etching was completed. The Ni surface (35) is very smooth and the separately metallised tip area (34) can be clearly distinguished in FIG. 9b. The tip area is slightly higher than the cantilever because it was plated twice. FIG. 9c shows a metal membrane from the tip side imaged by scanning electron microscopy (SEM). The pyramidal tip shown in the close-up in FIG. 9d was annealed at 400° C. The clean side walls indicate that there was no reaction between the Ti:W and the Si during the RTA step.

In a second embodiment of this aspect the probe tip and cantilever are made of the different materials, each having an appropriated metallisation scheme.

Although the same metal layers are applied for tip and cantilever in this particular process, the described procedure can also be used to make the tip from materials different from the cantilever material, applying e.g. Cr or diamond to obtain a harder probe tip. The anneal time can depend on the material used and can be further adapted depending on the desired hardness of the probe tip. This does not affect the peeling procedure. The separation between the two metallisation schemes is done by applying an additional patterning step to pattern the probe tip material. Subsequent process steps to improve the quality of the probe tip, such as annealing, can be done after this patterning. Additional material deposition can be done afterwards if the deposition process is selective with respect to the patterned probe tip. Otherwise additional patterning steps are required. As no backside etching is performed the probe tip, and later on, also the cantilever are supported by the full silicon wafer.

Figure 10A:
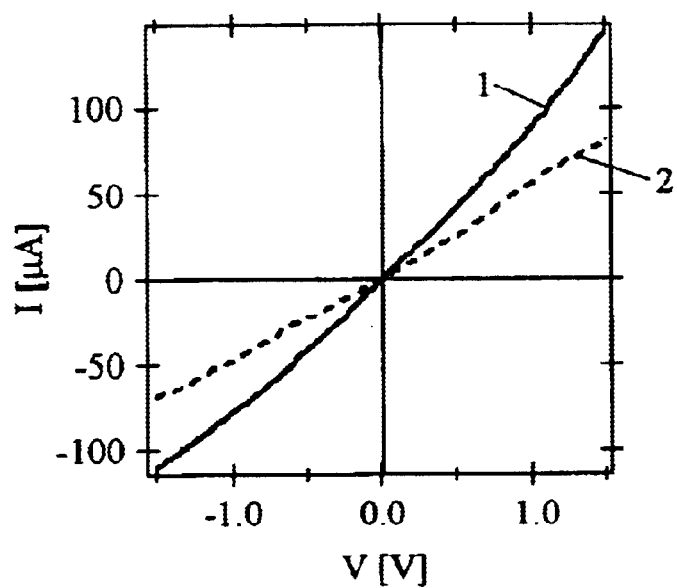
FIGS. 10a–b represent I-V measurements in point contact mode using an unhardened Ni tip (a) or a hardened Ni tip (b) according to an embodiment of the invention.
Figure 10B:
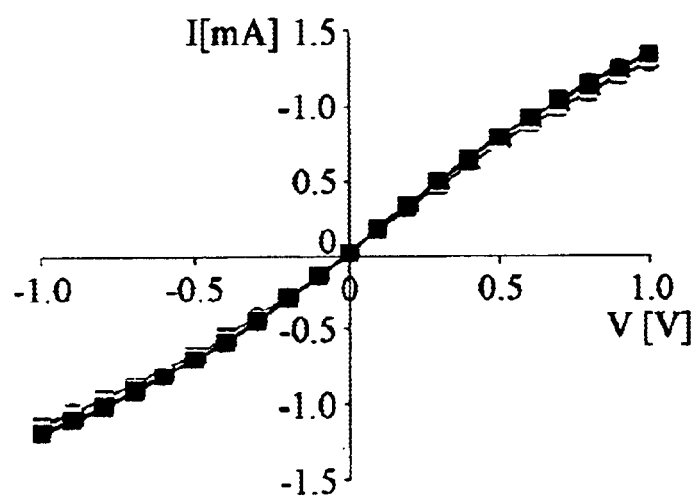
Figures 11A, 11B, 11C:
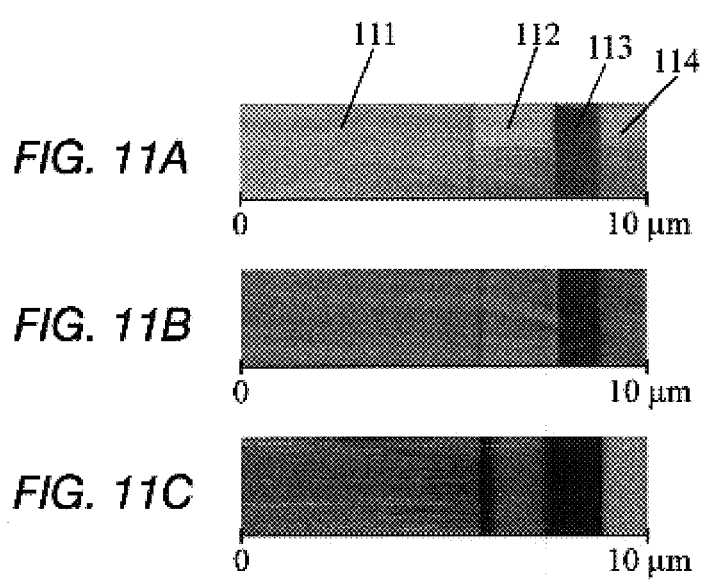
FIG. 11 represents a comparison of unhardened Ni pyramidal tip (a) and hardened Ni pyramidal tip (b), diamond pyramidal tip (c) according to an embodiment of the invention using SSRM on InP(S) substrate comprising an npn structure.

FIGS. 10–11 illustrate the good electrical and mechanical behaviour of probe tips made according to one or more embodiments of the invention.

I–V measurements on n-type Si ($\rho=0.1$ $\Omega$cm) were done in order to find out if the hardened metal tips are able to establish a stable Ohmic contact on Si. It is well-known that an Ohmic contact on Si can be obtained by transforming the Si underneath the tip to the so-called metallic β-tin phase. A pressure of 10–12 GPa is needed for that and the unhardened Ni tips withstood this high pressure for a very short time as can be seen in FIG. 10a. The first I–V curve (solid line) was collected after increasing the force until the point where the contact behaviour changed from Schottky to Ohmic. The second I–V curve (dashed line) was collected shortly afterwards and showed already an increase in resistance indicating rapid tip degradation at high forces. The electrical contact was lost in the next measurement. FIG. 10b shows a set of 20 I–V curves measured using a peel-off probe where the Ni tip was hardened by an annealing step at 400° C. for 10 minutes. It can be clearly seen that the hardened probe tip withstands the high forces in point contact and holds the Ohmic regime. The Ohmic regime was also achieved after scanning the tip over the surface for a while and going back into point contact.

Good results on spreading resistance microscopy (SSRM) on InP device structures have been obtained with metal pyramids integrated into Si cantilevers. A study was done in order to compare the hardness of unhardened and hardened probes with each other (FIG. 11). Three kinds of Ni tips were tested: unhardened Ni tip (a), Ni tip hardened at 300° C. (b), and metal cantilever with integrated diamond tip (c). The test sample was a multilayer InP structures which was epitaxially grown by metal-organic chemical vapor deposition (MOCVD). The layer structure was p-n-p on a semi-insulating InP(S) substrate where the n-type layer was Si doped and the p-type layers were Zn doped. SSRM measurements were done on a cleaved cross section using a scan size of 10×10 $\mu m^2$ and a scan speed of 1 Hz. The sample was biased at 3.0 V and the same high force was applied to the three probe tips during scanning. No significant difference was found between hardened and unhardened Ni tips. The peel off probes performed as good as the Si cantilever probes manufactured according to the prior art technology.

What is claimed is:

1. A method of manufacturing a probe comprising a cantilever beam, a probe tip and a contact area, said method comprising the steps of:
   etching a substrate using a first patterned masking layer as an etch mask, said etching creating a mold in said substrate;
   depositing a first layer on said mold and on said patterned masking layer;
   patterning said first layer to form the probe tip and the contact area;
   partially under-etching the probe tip using said patterned first layer as a hard mask; and
   peeling off the probe tip from the underlying first patterned masking layer.

2. The method as recited in claim 1, further comprising the step of using said patterned first layer as a mask to remove said first patterned masking layer.

3. The method as recited in claim 1, further comprising the step of selectively depositing at least one additional layer on said patterned first layer.

4. The method as recited in claim 3, wherein said deposited first layer comprises a metal, and wherein said step of selectively depositing comprises the step of plating.

5. The method as recited in claim 4, wherein said deposited first layer comprises Ti, W and Au and said additional layer comprises Ni.

6. The method as recited in claim 1, further comprising the steps of:
   temporarily spacing apart a substantial part of said probe tip and said underlying first patterned masking layer; and
   attaching a holder chip to said contact area.

7. The method as recited in claim 1, wherein said partially under-etching of said probe tip under-etches at least the probe tip.

8. The method as recited in claim 1, wherein patterning said first layer comprises forming the cantilever beam between the contact area and the probe tip, and said partially under-etching of said probe tip under-etches at least the probe tip and the cantilever beam.

9. The method as recited in claim 1, further comprising the steps of:
   depositing a second layer on said mold and on said first patterned masking layer; and
   patterning said second layer to form the probe tip.

10. The method as recited in claim 9, wherein said first and said second layers comprise substantially the same material.

11. The method as recited in claim 10, wherein said material comprises Ti, W and Au.

12. The method as recited in claim 9, wherein said first and said second layers comprise substantially different material.

13. The method as recited in claim 12, wherein said first layer comprises Ti, W and Au and said second layer comprises Cr or Diamond.

14. The method as recited in claim 9, further comprising the step of annealing.

15. The method as recited in claim 1, wherein said substrate comprises silicon.

16. The method as recited in claim 1, wherein said first patterned masking layer comprises one of oxides, nitrides, and oxynitrides.

17. A probe comprising:
   a substrate etched using a first patterned masking layer as an etch mask, said substrate comprising a mold; and
   a first layer deposited on said mold and on said patterned masking layer;
   wherein said first layer is patterned to form a probe tip, a cantilever beam and a contact area;
   and wherein the probe tip is partially under-etched using said patterned first layer as a hard mask; and
   wherein the probe tip is peeled off from the underlying first patterned masking layer.

18. The probe as recited in claim 17, wherein the probe further comprises:
   a second layer deposited on said mold and on said first patterned masking layer;
   wherein said second layer is patterned to form the probe tip.

* * * * *